United States Patent
Heise

(10) Patent No.: US 9,368,770 B2
(45) Date of Patent: Jun. 14, 2016

(54) BATTERY COOLING MODULE FOOT PROFILE DESIGN FOR A JOINTLESS CONDUCTIVE FIN/FOOT COMPRESSED INTERFACE CONNECTION

(75) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 1019 days.

(21) Appl. No.: 13/069,562

(22) Filed: Mar. 23, 2011

(65) Prior Publication Data

US 2012/0244407 A1 Sep. 27, 2012

(51) Int. Cl.
*H01M 6/50* (2006.01)
*H01M 10/60* (2014.01)
*H01M 2/10* (2006.01)
*H01M 10/625* (2014.01)
*H01M 10/6555* (2014.01)
*H01M 10/6554* (2014.01)
*H01M 10/613* (2014.01)
*H01M 10/0525* (2010.01)

(52) U.S. Cl.
CPC .............. *H01M 2/1077* (2013.01); *H01M 6/50* (2013.01); *H01M 6/5011* (2013.01); *H01M 6/5038* (2013.01); *H01M 10/613* (2015.04); *H01M 10/625* (2015.04); *H01M 10/6554* (2015.04); *H01M 10/6555* (2015.04); *H01M 2/1083* (2013.01); *H01M 10/0525* (2013.01); *Y10T 29/4935* (2015.01)

(58) Field of Classification Search
CPC ..... H01M 6/50–6/5088; H01M 10/60–10/627; G04D 23/01
See application file for complete search history.

(56) References Cited

U.S. PATENT DOCUMENTS

| 6,086,643 A * | 7/2000 | Clark | C25B 9/02 29/623.1 |
|---|---|---|---|
| 7,829,216 B2 * | 11/2010 | Han et al. | H01M 2/021 429/130 |
| 2005/0123828 A1 * | 6/2005 | Oogami et al. | 429/152 |
| 2006/0060236 A1 * | 3/2006 | Kim | 136/203 |
| 2007/0018610 A1 * | 1/2007 | Wegner | H01M 2/0212 320/112 |
| 2007/0207377 A1 * | 9/2007 | Han | H01M 2/021 429/162 |
| 2009/0186265 A1 * | 7/2009 | Koetting | H01M 6/5038 429/120 |
| 2010/0266883 A1 * | 10/2010 | Koetting | H01M 2/1077 429/96 |
| 2012/0009455 A1 * | 1/2012 | Yoon | H01M 10/65 429/120 |

FOREIGN PATENT DOCUMENTS

| CN | 1619858 A | 5/2005 |
|---|---|---|
| WO | 2010066637 A1 | 6/2010 |
| WO | 2011023823 A1 | 3/2011 |

* cited by examiner

*Primary Examiner* — Scott J Chmielecki
(74) *Attorney, Agent, or Firm* — Fraser Clemens Martin & Miller LLC; James D. Miller

(57) ABSTRACT

A cooling system for a battery cell includes a cooling plate and a heat sink. The heat sink has a pair of modules. An end of the cooling plate is constricted between the modules. The modules are placed under a compressive load to secure the cooling plate to the heat sink.

13 Claims, 1 Drawing Sheet

Figure 1:
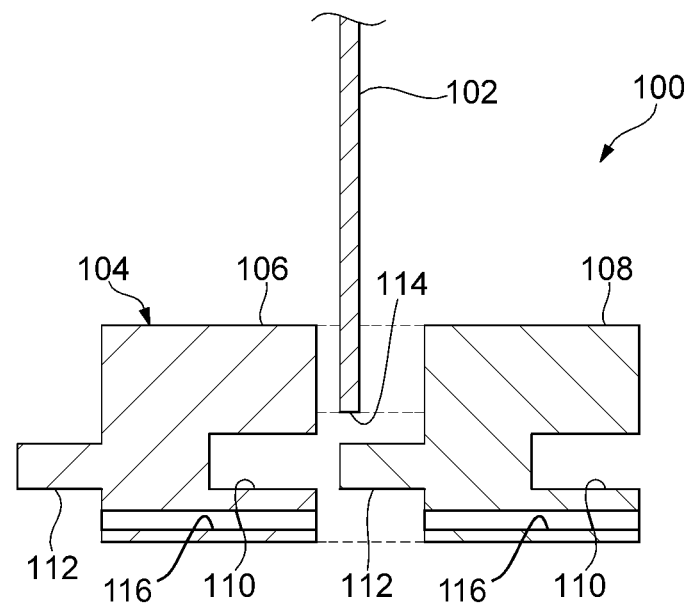

BATTERY COOLING MODULE FOOT PROFILE DESIGN FOR A JOINTLESS CONDUCTIVE FIN/FOOT COMPRESSED INTERFACE CONNECTION

FIELD OF THE INVENTION

The present disclosure relates to a battery pack and more particularly to a cooling system for the battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Typical prismatic battery cells have a pair of plastic coated metal layers fused around a periphery of the battery cell in order to seal the battery cell components. The sealing of the battery cells generally begins with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell for incorporation in the battery pack is thereby provided.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion batteries to militate against the undesirable overheating conditions. Known cooling systems for battery cells are described in Assignee's co-pending U.S. patent application Ser. No. 12/713,729 to Essinger et al. and U.S. patent application Ser. No. 12/842,478 to Kumar et al., the entire disclosures of which are hereby incorporated herein by reference.

Conventional cooling systems have included cooling plates or fins sandwiched between individual battery cells within the battery pack. The cooling fins are typically joined by "hot" methods such as brazing or welding to a heat sink. Hot joining methods can undesirably affect material microstructure, which can affect joint durability. Known joining methods also typically require filler material such as brazing solders, welding consumables, bonding adhesives, and thermal interface materials, which can undesirably affect thermal conductivity and increase manufacturing complexity.

A further joining method involving heat shrinking is described in Assignee's co-pending U.S. patent application Ser. No. 13/035,236 to Heise, the entire disclosure of which is hereby incorporated herein by reference. The method includes the steps providing at least one plate having at least one key, and providing a heat sink having at least one slot formed therein. The heat sink is heated to a first temperature sufficient to thermally expand the heat sink and expand the at least one slot. The at least one key of the at least one plate is then inserted in the at least one slot. The heat sink is then cooled to a second temperature sufficient to thermally contract the heat sink and contract the at least one slot. An interference fit joint securing the at least one plate to the heat sink is thereby formed.

There is a continuing need for a battery cooling system and a method for making the battery cooling system that maximizes a durability at joints of the battery cooling system. Desirably, the battery cooling system and method does not require filler materials, facilitates a thermal conductivity from adjacent battery cells, and has a minimized manufacturing complexity.

SUMMARY OF THE INVENTION

In concordance with the instant disclosure, a battery cooling system and a method for making the battery cooling system that maximizes a durability at joints of the battery cooling system, does not require filler materials, facilitates a thermal conductivity from adjacent battery cells, and has a minimized manufacturing complexity, is surprisingly discovered.

In a first embodiment, a cooling system for a battery cell includes a cooling plate and a heat sink. The heat sink has a pair of modules. An end of the cooling plate is constricted between the modules to secure the cooling plate to the heat sink.

In another embodiment, a battery pack includes a battery cell and a cooling system for the battery cell. The cooling system for the battery cell includes a cooling plate and a heat sink. The heat sink has a pair of modules. An end of the cooling plate is disposed between the modules. The modules are placed under a compressive load to secure the cooling plate to the heat sink.

In a further embodiment, a method for manufacturing a cooling system for a battery cell includes the steps of: providing a cooling plate; providing a heat sink having a pair of modules; disposing an end of the cooling plate between the modules; and placing the modules under a compressive load to secure the cooling plate to the heat sink.

DRAWINGS

The above, as well as other advantages of the present disclosure, will become readily apparent to those skilled in the art from the following detailed description, particularly when considered in the light of the drawings described herein.

Figure 2:
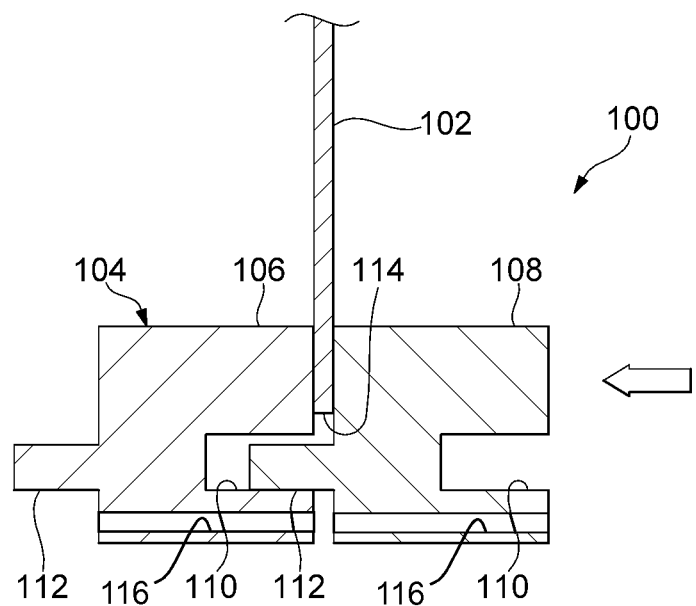

FIG. 1 is a fragmentary cross sectional plan view illustrating a battery cell cooling system, the battery cell cooling system shown unassembled; and FIG. 2 is a fragmentary cross sectional plan view illustrating the battery cell cooling system of FIG. 1, the battery cell cooling system shown assembled.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

With reference to FIGS. 1 and 2, a cooling system 100 for a battery cell (not shown) is illustrated. The battery cell is configured to generate power from an electrochemical reaction. The battery cell may be a prismatic battery cell, for example, as described and shown in Assignee's co-pending U.S. patent application Ser. No. 13/035,236 to Heise. As a nonlimiting example, the battery cell is a prismatic lithium ion (Li-ion) pouch cell. It should be appreciated that other types of the battery cells, employing a different structure and electrochemistry, may also be used within the scope of the present invention.

The cooling system 100 includes at least one cooling plate 102. The cooling plate 102 is configured to be disposed adjacent the battery cell. It should be appreciated that more cooling plates 102 can be used, with individual battery cells disposed between pairs of the cooling plates 102 to form a battery pack, as desired. The cooling plate 102 functions as a cooling fin of the cooling system 100, and transfers heat from the battery cell during an operation thereof. The plate 102 may be formed from any material having a thermal conductivity suitable for transferring heat away from the battery cell. As a nonlimiting example, the plate 102 is formed from one of aluminum and steel. Thermally conductive composite materials may also be employed to form the cooling plate 102. One of ordinary skill in the art may select other suitable thermally conductive materials for the cooling plate 102, as desired.

The cooling system 100 also includes a heat sink 104 configured to transfer heat away from the cooling plate 102 during the operation thereof. As with the cooling plate 102, the heat sink 104 may be formed from any material having a thermal conductivity suitable for transferring heat away from the cooling plate 102. For example, the heat sink 104 may be formed from one of aluminum and steel. Other suitable thermally conductive materials for the heat sink 104 may also be selected within the scope of the present disclosure.

The heat sink 104 of the present disclosure includes a plurality of modules 106, 108. Although only two of the modules 106, 108 are shown, it is understood that additional modules 106, 108 can be and typically are used. The plurality of modules 106, 108 may be assembled under a compressive load to form the heat sink 104. The plurality of modules 106, 108 as shown includes a first module 106 and a second module 108. The first module 106 may include a groove 110 and the second module 108 may include a tongue 112. In particular embodiments, each of the plurality of modules 106, 108 includes the groove 110 and the tongue 112. The groove 110 of the first module 106 cooperates with and receives the tongue 112 of the adjacent second module 108 when the first module 106 and the second module 108 are aligned and assembled under compression to form the heat sink 104. A skilled artisan may select the suitable load for compressing the modules 106, 108 of the heat sink 104, as desired.

In certain embodiments, each of the modules 106, 108 of the heat sink 104 may have apertures 116 formed therethrough. The apertures 116 of the modules 106, 108 when compressed in the heat sink 104 may form a conduit through which a cooling fluid may be circulated, in order to transfer heat from the heat sink 104. For example, the cooling fluid be a gas such as air or a liquid such as water. Other suitable cooling fluids may also be used within the scope of the present disclosure When the cooling system 100 is assembled, an end 114 of the cooling plate 102 is compressed between a pair of the modules 106, 108, such as the first module 106 and the second module 108. For example, the end 114 of the plate 102 may terminate adjacent the groove 110 and the tongue 112 of the pair of modules 106, 108, between which the end 114 of the plate 102 is disposed and constricted. The cooling plate 102 is secured by friction forces to the heat sink 104 when the modules 106, 108 are placed under the compressive load. Any means for placing the modules 106, 108 under the compressive load including, but not limited to, tie rods, springs, bands, compression retention systems, and the like may be used within the scope of the present disclosure. A thermally conductive interface connection thereby exists between the end 114 of the cooling plate 102 and the pair of modules 106, 108. The compressive load and resulting friction-based securing of the cooling plate 102 to the heat sink 104 eliminates a need for a filler material between either the first module 106 and the second module 108 or between either of the pair of modules 106, 108 and the cooling plate 102.

It should be appreciated that filler materials such as welding consumables, bonding adhesives, and thermal interface materials, as are known in the art, are unnecessary with the cooling system 100 of the present disclosure. The filler materials would otherwise affect thermal conductivity at the interface connection between the cooling plate 102 and the heat sink 104. An efficient transfer of heat from the cooling plate 102 to the heat sink 104 during the operation of the battery cell is provided by the thermally conductive interface connection of the cooling system 100.

The present disclosure further includes a method for manufacturing the cooling system 100 for the battery cell. The method includes the steps of disposing the end 114 of the cooling plate 102 between the pair of modules 106, 108 of the heat sink 104. The modules 106, 108 of the heat sink 104 are then placed under the compressive load to secure the cooling plate 102 to the heat sink 104. Where the modules 106, 108 have the cooperating grooves 110 and the tongues 112, the grooves 110 and the tongues 112 of the modules 106, 108 may be aligned prior to placing the modules 106, 108 under the compressive load. The step of disposing the end 114 of the cooling plate 102 between the modules 106, 108 may include inserting the end 114 adjacent at least one of the groove 110 and the tongue 112 of the adjacent modules 106, 108, for example. It should be appreciated that the end 114 is not inserted at a location where the end 114 of the cooling plate 102 would interfere with the receiving of the tongue 112 by the groove 114 of the modules 106, 108.

In an alternative embodiment, the end 114 of the cooling plate 102 may have one of a slot (not shown) and an aperture (not shown) formed therein that permits the tongue 112 of the second module 108 to be disposed therethrough and cooperate with the groove 110 of the adjacent first module 106. The cooling plate 102 may thereby be further secured to the heat sink 104. A plurality of the grooves 110 and a plurality of the tongues 112 may likewise be employed. Other non-filler material means for joining the cooling plate 102 with the heat sink 104 may also be used within the scope of the present disclosure.

Advantageously, the cooling system 100 and the method of the disclosure minimize a complexity of a joining operation for the cooling plate 102 and the heat sink 104. Additional joining process materials are not necessitated by the present method. The cooling system 100 further permits greater serviceability compared to known battery cooling systems, which are joined by welding or brazing, and in which welds may be broken in order to service the cooling system 100.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling system for a battery cell, comprising:
   a cooling plate; and
   a heat sink having a pair of modules, each of the modules including a tongue, a groove, and an aperture formed therethrough, an end of the cooling plate constricted between and contacting each of the modules to secure the cooling plate to the heat sink, the pair of modules including a first module and a second module, the groove of the first module cooperating with the tongue of the second module, the end of the cooling plate terminates adjacent the groove of the first module and the tongue of the second module, the cooling plate secured by friction to the heat sink, the aperture of the first module cooperating with the aperture of the second module to form a conduit.

2. The cooling system of claim 1, wherein the cooling plate is disposed adjacent the battery cell and transfers heat from the battery cell during an operation thereof.

3. The cooling system of claim 1, wherein the heat sink is substantially free of any filler material between the modules.

4. The cooling system of claim 1, wherein the heat sink is substantially free of any filler material between each of the modules and the cooling plate.

5. The cooling system of claim 1, wherein a thermally conductive interface connection is formed between the cooling plate and the adjacent modules of the heat sink.

6. A battery pack, including
a battery cell; and
a cooling system for the battery cell, the cooling system including a cooling plate disposed adjacent the battery cell and a heat sink having a pair of modules, each of the modules includes a tongue, a groove, and an aperture formed therethrough, an end of the cooling plate disposed between and contacting each of the modules, the modules placed under a compressive load to secure the cooling plate to the heat sink, the pair of modules including a first module and a second module, the groove of the first module cooperating with the tongue of the second module, the end of the cooling plate terminates adjacent the groove of the first module and the tongue of the second module, the cooling plate secured by friction to the heat sink, the aperture of the first module cooperating with the aperture of the second module to form a conduit.

7. The battery pack of claim 6, wherein the heat sink is substantially free of any filler material between the modules.

8. The battery pack of claim 6, wherein the heat sink is substantially free of any filler material between each of the modules and the cooling plate.

9. The battery pack of claim 6, wherein the compressive load provides a thermally conductive interface connection between the cooling plate and the adjacent modules of the heat sink.

10. A method for manufacturing a cooling system for a battery cell, the method comprising the steps of: providing a cooling plate; providing a heat sink having a pair of modules, each of the modules including a tongue, a groove, and an aperture formed therethrough, the pair of modules including a first module and a second module; disposing an end of the cooling plate between the modules by inserting the end of the cooling plate adjacent the groove of the first module and the tongue of the second module and positioning the groove of the first module and the tongue of the second module so that the groove of the first module cooperates with the tongue of the second module and the aperture of the first module cooperates with the aperture of the second module to form a conduit; and placing the modules under a compressive load to secure the cooling plate to the heat sink, the cooling plate secured by friction to the heat sink.

11. The method of claim 10, further comprising the step of aligning the tongues and the grooves of the modules prior to placing the modules under the compressive load.

12. The method of claim 10, wherein the compressive load provides a thermally conductive interface connection between the cooling plate and the adjacent modules of the heat sink.

13. The cooling system of claim 1, wherein the first module includes a first surface having the groove formed therein and the second module includes a second surface having the tongue projecting therefrom, the first surface contacting a first side of the cooling plate and the second surface contacting a second side of the cooling plate opposite the first side.

\* \* \* \* \*